(12) United States Patent
Rooke

(10) Patent No.: US 6,304,921 B1
(45) Date of Patent: Oct. 16, 2001

(54) SYSTEM FOR SERIAL PERIPHERAL INTERFACE WITH EMBEDDED ADDRESSING CIRCUIT FOR PROVIDING PORTION OF AN ADDRESS FOR PERIPHERAL DEVICES

(75) Inventor: Alan M. Rooke, Northville, MI (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/206,711

(22) Filed: Dec. 7, 1998

(51) Int. Cl.[7] .............................. G06F 3/00; G06F 13/12; G06F 13/38
(52) U.S. Cl. .................. 710/4; 710/3; 710/8; 710/9; 710/62; 710/64; 710/73
(58) Field of Search .................... 710/8, 16, 18, 710/64, 73, 3, 4, 9, 23, 48

(56) References Cited

U.S. PATENT DOCUMENTS

| | | | |
|---|---|---|---|
| 3,881,174 | * | 4/1975 | Barnich ................................. 710/48 |
| 4,815,034 | * | 3/1989 | Mackey .................................. 710/64 |
| 4,918,657 | * | 4/1990 | Takahashi ............................ 365/203 |
| 5,404,460 | * | 4/1995 | Thomsen et al. ......................... 710/9 |
| 5,408,612 | * | 4/1995 | Shiron et al. ......................... 710/107 |
| 5,475,854 | * | 12/1995 | Thomsen et al. ...................... 710/23 |
| 5,828,899 | * | 10/1998 | Richard et al. .......................... 710/8 |
| 5,864,715 | * | 1/1999 | Zani et al. ............................ 395/883 |
| 5,922,056 | * | 7/1999 | Amell et al. ............................ 710/16 |
| 5,926,648 | * | 7/1999 | Ayzenberg ............................... 710/3 |
| 5,991,830 | * | 11/1999 | Beard et al. ............................ 710/18 |

* cited by examiner

*Primary Examiner*—Thomas Lee
*Assistant Examiner*—Chun Cao
(74) *Attorney, Agent, or Firm*—Robert L. King

(57) ABSTRACT

A microcontroller (12) provides the address bit and device data start bits for the first peripheral device (PD) in a string of PDs (20–24 or 30–34). Each PD includes a string of flipflops (72–86). If the complete address matches, then the first PD (20) shifts out the device data start bits for the next PD (22) in that string. The address bit for the next PD is provided by the pull-up or pull-down device (52) hard-wired on the SI of the next PD. The device data start bits for the next PD are provided by right-most flipflops of the previous PD. If the address bit and device data start bits match the contents of the device registers of next PD, then that next PD enables SYSCLK to shift out the contents of flipflops.

18 Claims, 2 Drawing Sheets

SYSTEM FOR SERIAL PERIPHERAL INTERFACE WITH EMBEDDED ADDRESSING CIRCUIT FOR PROVIDING PORTION OF AN ADDRESS FOR PERIPHERAL DEVICES

BACKGROUND OF THE INVENTION

The present invention relates in general to a microcontroller interface to peripherals and, more particularly, to a serial peripheral interface with an embedded addressing scheme.

Microcontrollers and other microprocessors are used in a myriad of applications to control external devices. For example, a microcontroller may control the various system functions of a vehicle. Alternatively, a microprocessor controls peripheral chips in a computer system. The microcontroller communicates with the external device through a serial peripheral interface (SPI). The microcontroller typically has an SPI and the external device has an SPI. The SPI is a standard that handles the communication protocol, signal level compatibility, data transfer, clocking, handshaking, and control and status interchange.

In one prior art application, the microcontroller has a serial output and chip select coupled to a peripheral device. The chip select enables the peripheral device to receive control data at its serial input from the serial output of the microcontroller. The control data configures or controls the peripheral device. When there are multiple peripheral devices, the chip select is routed to a multiplexer having one input and several selectable outputs, one for each peripheral device. An address signal from the microcontroller selects one of the multiplexer outputs to enable the desired peripheral device. The selectable chip select solution adds components and complexity, i.e. the multiplexer and addressing, to the overall design.

Alternatively, the peripheral devices are cascaded with the serial output of one device coupled to the serial input of the next device in the chain. The serial output from the microcontroller is coupled to the serial input of the first peripheral device in the chain. The chip select enables all peripheral devices. The peripheral devices are addressed by the control data bits. The control data from the microcontroller is serially clocked through each peripheral device in the chain so that the first control data output ends up in the last peripheral device and the last control data output ends up in the first peripheral device. If there are four cascaded peripheral devices and each device receives 8 bits of control data, then the microcontroller provides 32 bits of data over 32 clocks. The disadvantage of cascading the peripheral devices with a common chip select is the communication latency of writing long strings of control data bits to address and configure the peripheral devices.

Other prior art techniques of embedded addressing such as the controller area network (CAN) require permanent storage elements for the address programming to individualize multiple uses of the same peripheral device.

Thus, a need exists to simplify the control and reduce latency overhead in writing to peripheral devices through a serial peripheral interface.

DETAILED DESCRIPTION OF THE PREFERRED EMBODIMENT

Figure 1:
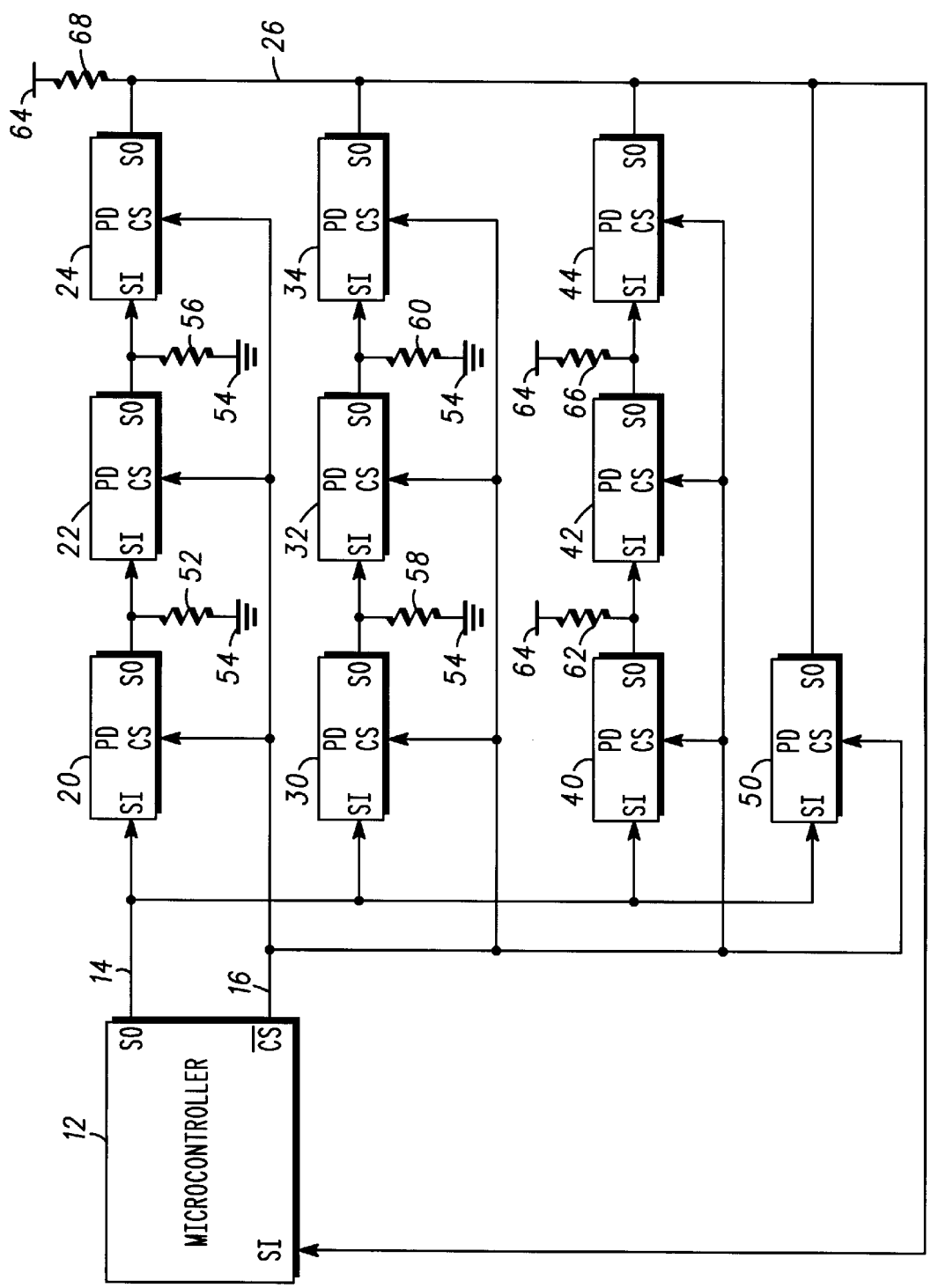
FIG. 1 is a block diagram of a microcontroller communicating with peripheral devices.

Referring to FIG. 1, an electrical system 10 is shown including a microcontroller or other electronic control circuit 12 having its serial output (SO) on conductor 14 and its chip select ($\overline{CS}$) output on conductor 16. Microcontroller 12 communicates with peripheral devices (PD) in electrical system 10. For example, microcontroller 12 sends configuration and control data signals to the PDs to setup or modify their function or operation. In an automotive application, microcontroller 12 is one integrated circuit (IC) residing in a control module. The PDs include smart power drivers implemented as separate ICs also residing in the control module, or in other modules, that control vehicle functions. One PD controls the fuel injectors, another PD controls transmission solenoids, and so on.

Conductor 14 is coupled to the serial input (SI) of PD 20. The SO of PD 20 is coupled to the SI of PD 22. The SO of PD 22 is coupled to the SI of PD 24. The SO of PD 24 is coupled back to the SI of microcontroller 12 on conductor 26. PDs 20, 22, and 24 are like-peripheral devices in that they are physically similar in construction and operation. Conductor 14 is also coupled to the SI of PD 30. The SO of PD 30 is coupled to the SI of PD 32. The SO of PD 32 is coupled to the SI of PD 34. The SO of PD 34 is coupled back to the SI of microcontroller 12 on conductor 26. PDs 30, 32, and 34 are like-peripheral devices, but may be unlike PDS 20, 22, and 24. Conductor 14 is further coupled to the SI of PD 40. The SO of PD 40 is coupled to the SI of PD 42. The SO of PD 42 is coupled to the SI of PD 44. The SO of PD 44 is coupled back to the SI of microcontroller 12 on conductor 26. PDs 40, 42, and 44 are like-peripheral devices, but unlike PDs 20, 22, and 24 and PDs 30, 32, and 34. Conductor 14 is also coupled to the SI of PD 50, and the SO of PD 50 is coupled back to the SI of microcontroller 12 on conductor 26. PD 50 is unlike PDs 20, 22, and 24 and PDs 30, 32, and 34. Conductor 16 connects the $\overline{CS}$ output of microcontroller 12 to the chip select inputs of all PDs.

Resistor 52 is a logic device coupled between the SI of PD 22 and power supply conductor 54 operating at ground potential for establishing a logic level on the SI of PD 22. Likewise, resistor 56 is a logic device coupled between the SI of PD 24 and power supply conductor 54 for establishing a logic level on the SI of PD 24. Resistors 52 and 56 are pull-down devices to set a logic zero on the SI of PD 22 and PD 24, respectively, when the SIs of PD 20 and PD 22 are not driven by the SOs of the previous PDs. Resistor 58 is coupled between the SI of PD 32 and power supply conductor 54. Resistor 60 is coupled between the SI of PD 34 and power supply conductor 54. Resistors 58 and 60 are pull-down devices to set a logic zero on the SI of PD 32 and PD 34, respectively, when the SIs of PD 30 and PD 32 are not driven by the SOs of the previous PDs. Resistor 62 is coupled between the SI of PD 42 and power supply conductor 64 operating at high potential such as VDD=5 volts. Resistor 66 is coupled between the SI of PD 44 and power supply conductor 64. Resistors 62 and 66 are pull-up devices to set a logic one on the SI of PD 42 and PD 44, respectively, when the SIs of PD 40 and PD 42 are not driven by the SOs of the previous PDs. Resistor 68 operates as a pull-up on conductor 26.

Figure 2:
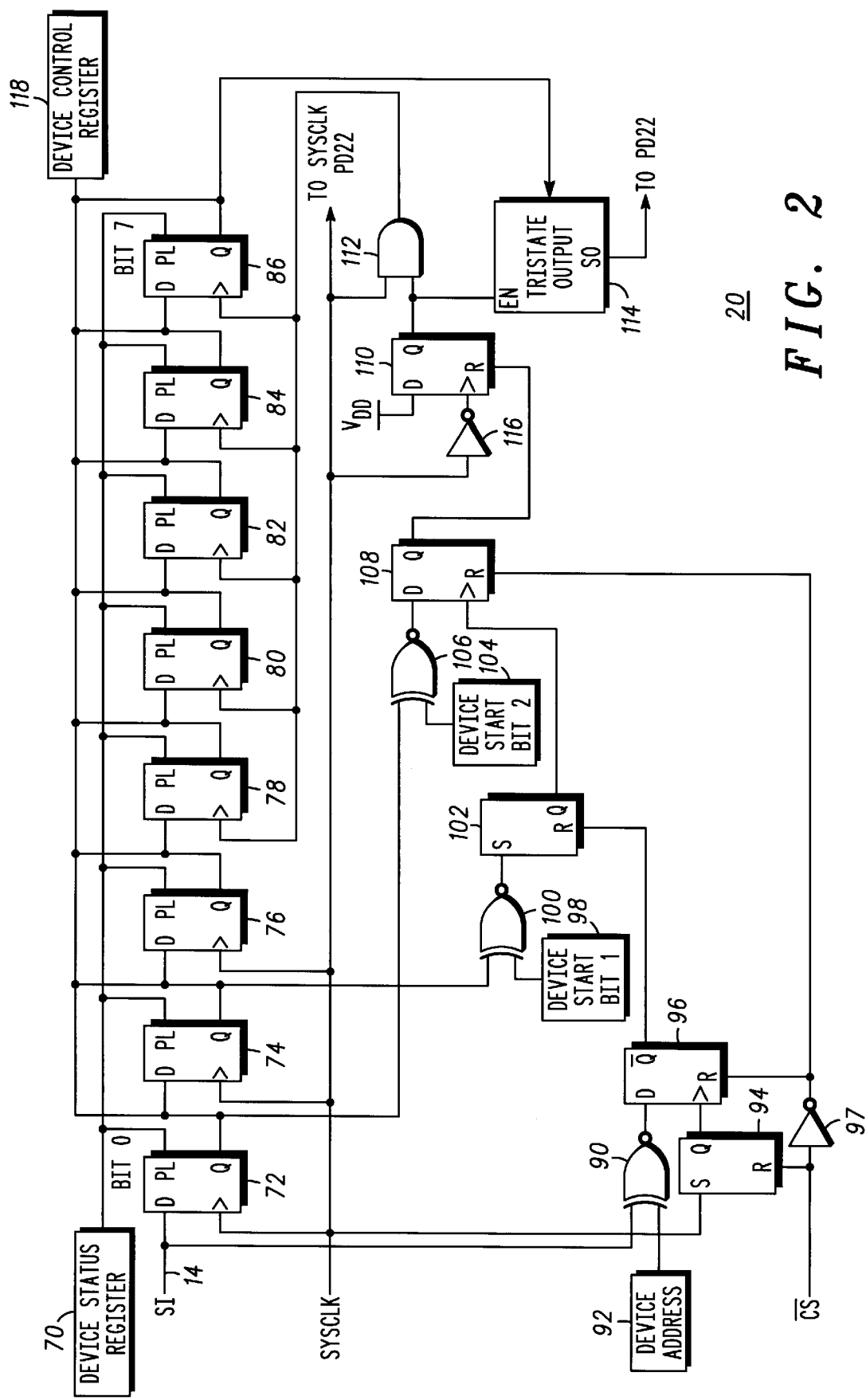
FIG. 2 illustrates further detail of the serial peripheral interface portion of the peripheral device.

Turning to FIG. 2, further detail of the SPI portion of PD 20 is shown. The SPI portions of the other PDs follow a similar construction and operation. Microcontroller 12 also includes an SPI to communicate with the SPI in the PDs. The SPI is an 8-bit register with serial control data being input to the SI and being output from the SO of each SPI. PD 20 includes an 8-bit device status register 70 with bit assignments as follows:

- bit 0—$\overline{\text{data start bit 1}}$
- bit 1—$\overline{\text{data start bit 1}}$
- bit 2—don't care
- bit 3—device status bit 0
- bit 4—device status bit 1
- bit 5—device status bit 2
- bit 6—device data start bit 2
- bit 7—device data start bit 1

The device status register 70 and flipflop chain 72–86 can be extended for additional device status/control bits and address bits.

At the beginning of an SPI communication sequence, the contents of device status register 70 are loaded into the parallel load (PL) inputs of flipflops 72–86 or other suitable storage elements. Bit 0 is loaded into flipflop 72, bit 1 is loaded into flipflop 74, bit 2 is loaded into flipflop 76, and so on. Assume for the present example that microcontroller 12 is addressing PD 20 with a control data bit sequence "01011111". The first three control data bits "010" represent the complete address of PD 20, i.e. one address bit "0" and two device data start bits "10". The next five control data bits "11111" represent the configuration and control data that set or modify the function and/or operation of PD 20. Microcontroller 12 places the first control data bit "0" on conductor 14. The $\overline{\text{CS}}$ signal on conductor 16 goes to logic zero to enable the PDs.

The system clock (SYSCLK) operating at say 2 MHz is enabled only when the $\overline{\text{CS}}$ signal is logic zero. At the rising edge of first SYSCLK, the first control data bit is read into flipflop 72. The prior contents of flipflop 72 ($\overline{\text{data start bit 1}}$) is passed along to flipflop 74, and the prior contents of flipflop 74 ($\overline{\text{data start bit 1}}$) is passed along to flipflop 76. The contents of flipflops 78–86 remain unchanged because their clock inputs are not asserted. The prior contents of flipflop 76 (i.e. bit 2 "don't care" parallel loaded from device status register 70) is lost.

The value of the first control data bit on conductor 14 is also applied to one input of exclusive-NOR gate 90. A second input of exclusive-NOR gate 90 receives a device address bit from device address register 92. If the value of the first control data bit on conductor 14 is the same as the device address bit then the output of exclusive-NOR gate 90 is logic one. Otherwise, the output of exclusive-NOR gate 90 is logic zero.

The embedded addressing scheme of the PDs is shown in table 1 as follows. Bits 0–7 represent the control data bits sent by microcontroller 12. Note that the address bit 0 is the inverse of the data start bit 1.

TABLE 1

| Devices | Address | Data Start Bits | | Peripheral Data Bits | | | | |
|---|---|---|---|---|---|---|---|---|
| | bit0 | bit1 | bit2 | bit3 | bit4 | bit5 | bit6 | bit7 |
| PD 20 | 0 | 1 | 0 | data | data | data | data | data |
| PD 22 | 0 | 1 | 0 | data | data | data | data | data |
| PD 24 | 0 | 1 | 0 | data | data | data | data | data |
| PD 30 | 0 | 1 | 1 | data | data | data | data | data |
| PD 32 | 0 | 1 | 1 | data | data | data | data | data |
| PD 34 | 0 | 1 | 1 | data | data | data | data | data |
| PD 40 | 1 | 0 | 0 | data | data | data | data | data |
| PD 42 | 1 | 0 | 0 | data | data | data | data | data |
| PD 44 | 1 | 0 | 0 | data | data | data | data | data |
| PD 50 | 1 | 0 | 1 | data | data | data | data | data |

For PD 20, device address register 92 contains a logic zero as per table 1. The device address bit matches bit 0 on conductor 14 and the output of exclusive-NOR gate 90 is logic one. Before $\overline{\text{CS}}$ is asserted, i.e. $\overline{\text{CS}}$ is logic one, the Q-output of flipflop 94 is reset to logic zero. When $\overline{\text{CS}}$ is logic one, the output of inverter 97 is logic zero which resets the $\overline{\text{Q}}$-output of flipflop 96 to logic one and the Q-output of flipflop 108 to logic zero. The logic one from the $\overline{\text{Q}}$-output of flipflop 96 resets the Q-output of flipflop 102 to logic zero. The logic zero from the $\overline{\text{Q}}$-output of flipflop 108 resets the Q-output of flipflop 110 to logic zero. When $\overline{\text{CS}}$ is asserted as a logic zero, the resets are removed from flipflops 94, 96, and 108 allowing each to change state with the next set signal or clock signal. The first SYSCLK signal to the set input of flipflop 94 sets its Q-output to logic one, which clocks flipflop 96 to store the logic one from exclusive-NOR gate 90. The $\overline{\text{Q}}$-output of flipflop 96 goes to logic zero and releases the reset on flipflop 102. According to table 1, PDs 20, 22, 24, 30, 32, and 34 all have the $\overline{\text{Q}}$-output of flipflop 96 set to logic zero. The device address bit in device address register 92 of PDs 40, 42, 44, and 50 are set to logic one as per table 1. PDs 40, 42, 44, and 50 have the $\overline{\text{Q}}$-output of flipflop 96 set to logic one because the logic one control data bit on conductor 14 does not match the device address bit in device address register 92 of the respective devices.

Microcontroller 12 places the second control data bit (bit 1) with value "1" on conductor 14. The second rising edge of SYSCLK shifts the second control data bit into flipflop 72, and shifts the first control data bit into flipflop 74, and shifts the prior contents of flipflop 74 ($\overline{\text{data start bit 1}}$) into flipflop 76.

In PD 20, device data start bit register 98 is preset to logic one to identify with the device data start bit 1 of PD 20 according to table 1. Exclusive-NOR gate 100 receives the device data start bit in register 98 and the contents of flipflop 74, which is the first control data bit (address bit). The embedded addressing rule of the present embodiment dictates that the address bit is the inverse of the data start bit 1. Therefore, at the second SYSCLK, the inputs of exclusive-NOR gate 100 are different and its output is logic zero. The Q-output of flipflop 102 remains at logic zero.

Microcontroller 12 places the third control data bit (bit 2) with value "0" on conductor 14. The third rising edge of SYSCLK shifts the third control data bit into flipflop 72, and shifts the second control data bit into flipflop 74, and shifts the prior contents of flipflop 74 (address bit) into flipflop 76.

Exclusive-NOR gate 100 receives the device data start bit in register 98 and the contents of flipflop 74, which is the second control data bit (device data start bit 1). For PD 20, the device data start bit in register 98 matches the device data start bit 1 in flipflop 74. The output of exclusive-NOR gate 100 goes to logic one. RS flipflop 102 sets its Q-output to logic one.

In PD 20, device data start bit register 104 is preset to logic zero to identify with the device data start bit 2 of PD 20 according to table 1. Exclusive-NOR gate 106 receives the device data start bit in register 104 and the contents of flipflop 72, which by the third SYSCLK is the second control data bit (device data start bit 2). For PD 20, the device data start bit in register 104 matches the device data start bit 2 in flipflop 72, and the output of exclusive-NOR gate 106 goes to logic one. The logic one from the Q-output of flipflop 102 clocks flipflop 108 and latches the logic one from its data input to its Q-output. The logic one on the Q-output of flipflop 108 releases the reset on flipflop 110.

The addressing of PD 20 is complete when the Q-output of flip-flop 108 goes to logic one. No other PD in the system will have its corresponding flip-flop 108 latching a logic one. The address "010" sent in the first three control data bits to the PDs uniquely identifies the string of PDs starting with PD 20.

During the first three SYSCLK periods before the Q-output of flip-flop 108 switches to logic one, the reset input of flip-flop 110 is held at logic zero. The data input of flip-flop 110 receives a fixed logic one from a positive power supply conductor operating at $V_{DD}$. AND gate 112 receives the SYSCLK on one input and the output of flipflop 110 on its other input. During the time flipflop 110 is held in reset, its Q-output remains at logic zero, and the output of AND gate 112 is logic zero thereby inhibiting any SYSCLK from reaching the clock inputs of flipflop 78–86. The logic zero from the Q-output of flipflop 110 also disables tri-state output driver 114.

When the address is complete and the Q-output of flipflop 108 goes to logic one, the reset input of flipflop 110 is released. The third falling edge of SYSCLK inverted by inverter 116 latches the logic one at the data input of flipflop 110 to its Q-output. With a logic one from flipflop 110, AND gate 112 passes the SYSCLK signal to the clock inputs of flipflops 78–86. The logic one from flipflop 110 also enables tri-state output driver 114.

As part of the present invention, PD 22 receives a series of control data bits. The first control data bit is generated by the pull-down resistor 52 in FIG. 1. The pull-down resistor 52 provides a logic zero address bit for PD 22 as per table 1. The second and third control bits, which are clocked into flipflops 72–86 of PD 22 on the fourth and fifth rising edges of SYSCLK, are the values originally loaded into flipflops 84 and 86 of PD 20. In general, once the address bit is recognized the PD waits n-clocks, where n is a number determined by the PDs position in the chain (for PD 22, n=2 for a count of two after the address bit is recognized), for its second and third control data bits.

The next SYSCLK period clocks in the logic zero address bit hard-wired by resistor 52 on the SI of PD 22 into flipflop 72 of PD 22. A comparison is made of the address bit with the contents of register 92 in PD 22 as described for PD 20. The next SYSCLK periods shift in the device data start bit 1 and bit 2 from flipflops 84 and 86 of PD 20 into flipflops 74 and 76 of PD 22 as described for PD 20. If the address bit and device data start bits match the contents of registers 92, 98, and 104 of PD 22, then flipflop 110 of PD 22 enables AND gate 112 of PD 22 to pass SYSCLK and to enable tri-state output buffer 114 to shift out the contents of flipflops 78–86 of PD 22. In the present example, address bit and device data start bits will match the contents of registers 92, 98, and 104 of PD 22 because the resistor 52 is specifically hard-wired as a pull-down device to match the device address bit of PD 22 and flipflops 84 and 86 of PD 20 are specifically loaded with the device data start bits of PD 22. In an alternate embodiment, instead of a pull-up or pull-down device, a logic gate or other logic device, either external to the PD or internal to the PD, could provide a logic level as the address bit to the second and later PDs in the chain.

The embedded addressing scheme provided by the present invention reduces the latency and overhead of writing long strings of control data to cascaded like-peripheral devices by using the pull-up or pull-down device as the address bit and the device data start bits stored in the last two flipflops of the previous PD in order to address the next PD in the chain. Another advantage of the present invention is that the SPI of each PD is constructed in a similar manner. The address variation relies on selecting the proper pull-up or pull-down on the SI of the PD and loading the last two flipflops of the previous PD with the appropriate device data start bit values for the next PD.

The embedded addressing process is similar for PD 24. As described above, the address bit and device data start bits sent to the SI of PD 24 matches the contents of registers 92, 98, and 104 of PD 24 because the resistor 56 is specifically hard-wired as a pull-down device to match the device address bit of PD 24 and flipflops 84 and 86 of PD 22 are specifically loaded with the device data start bits of PD 24.

The same embedded addressing scheme follows for PDs 30, 32, and 34 or for PDs 40, 42, and 44. Microcontroller 12 provides the address bit and device data start bits for the first PD in the string, i.e. PD 30 or PD 40. If the complete address matches, then the first PD shifts out the device data start bits for the next PD in the string. The address bit is provided by the pull-up or pull-down device hard-wired on the SI of the next PD. The device data start bits are provided by right-most flipflops of the previous PD. If the address bit and device data start bits match the contents of registers 92, 98, and 104 of next PD, then flipflop 110 of that next PD enables SYSCLK to enable tri-state output buffer 114 and shift out the contents of flipflops 78–86.

As the device control bits are clocked from conductor 14 into the SPI, the contents of the device status register 70 as parallel loaded into flipflops 72–86 are clocked out and sent back to microcontroller 12. The device control bits are loaded from the output of flipflops 72–86 into device control register 118 of each PD to control its operation after $\overline{CS}$ returns to logic one. The device status bits sent back to microcontroller 12 provide information about the PD, for example, whether a fault or error condition existed with the PD. If the PD is shut down, then that status code is sent back to microcontroller 12 to let it know that the device control bits sent to the PD are ineffective.

In summary, the present invention uses a microcontroller 12 to provide the address bit and device data start bits for the first PD in a string of PDs in a chain. Multiple chains of PDs operate under control of a single serial output and chip select of the microcontroller. Each chain of PDs has like-peripheral devices. Each PD includes a string of flipflops. The contents of a device status register are loaded into the flipflops. If the complete address matches, then the first PD shifts out the device data start bits for the next PD in the string. The address bit for the next PD is provided by the pull-up or pull-down device hard-wired on the SI of the next PD. The device data start bits for the next PD are provided by right-most flipflops of the previous PD. If the address bit and device data start bits match the contents of the device registers of the next PD, then that next PD enables SYSCLK to shift out the contents of flipflops. As the device control bits are clocked from conductor 14 into the SPI, the contents of the device status register are clocked out and sent back to the microcontroller.

The present invention provides for like-peripheral devices to be cascaded while unlike-devices are addressed in parallel. Thus, there are multiple short chains of peripheral devices on one chip select instead of one long chain. This improves the address latency.

What is claimed is:

1. A serial peripheral interface, comprising:
   one or more first storage elements serially coupled between an input and an output, wherein the input is coupled for receiving a data signal;
   one or more second storage elements serially coupled between an input and an output, wherein the input of the one or more second storage elements is coupled to the output of the one or more first storage elements;
   a device coupled to the input of the second storage elements for establishing a logic level at the input of the second storage elements for providing a first portion of an address for the second storage elements;

wherein each of the one or more first storage elements and second storage elements comprises a plurality of serially connected clocked storage devices having a terminal for receiving a clock signal; and logic means within each of the one or more first storage elements and each of the one or more second storage elements for receiving the data signal and inhibiting clocking of a portion of the plurality of serially connected clocked storage devices until address verification is performed by the logic means using one or more control bits within the data signal.

2. The serial peripheral interface of claim 1 wherein the device includes a resistor coupled between the input of the second storage elements and a first power supply conductor.

3. The serial peripheral interface of claim 1 wherein the one or more first storage elements comprises a plurality of first storage elements and a last one of the first storage elements provides a second portion of the address for the second storage elements.

4. The serial peripheral interface of claim 1 wherein the one or more first storage elements is a plurality of storage elements and comprises:

a first flipflop having a data input coupled to the input, and a clock input coupled for receiving the clock signal;

a second flipflop having a data input coupled to an output of the first flipflop, and a clock input coupled for receiving the clock signal;

a third flipflop having a data input coupled to an output of the second flipflop, and a clock input coupled for receiving the clock signal; and a fourth flipflop having a data input coupled to an output of the third flipflop and an output coupled to the output of the plurality of storage elements.

5. A serial peripheral interface comprising:

a plurality of first storage elements serially coupled between an input and an output, wherein the input is coupled for receiving a data signal, the plurality of first storage elements comprising:

a first flipflop having a data input coupled to the input of the first storage elements, and a clock input coupled for receiving a clock signal;

a second flipflop having a data input coupled to an output of the first flipflop, and a clock input coupled for receiving the clock signal;

a third flipflop having a data input coupled to an output of the second flipflop, and a clock input coupled for receiving the clock signal; and a fourth flipflop having a data input coupled to an output of the third flipflop and an output coupled to the output of the first storage elements;

a plurality of second storage elements serially coupled between an input and an output, wherein the input of the second storage elements is coupled to the output of the first storage elements;

a logic device coupled to the input of the second storage elements for establishing a logic level at the input of the second storage elements for providing a first portion of an address for the second storage elements;

a first logic gate having a first input coupled to the input of the first storage elements;

a first register having an output coupled to a second input of the first logic gate;

a first RS flipflop having a reset input coupled for receiving a chip select signal, and a set input coupled for receiving the clock signal; and a fifth flipflop having a data input coupled to an output of the first logic gate, and a clock input coupled to an output of the first RS flipflop.

6. The serial peripheral interface of claim 5 further including:

a second logic gate having a first input coupled to the output of the second flipflop;

a second register having an output coupled to a second input of the second logic gate; and a second RS flipflop having a reset input coupled to an output of the fifth flipflop, and a set input coupled to an output of the second logic gate.

7. The serial peripheral interface of claim 6 further including:

a third logic gate having a first input coupled to the output of the first flipflop;

a third register having an output coupled to a second input of the third logic gate; and a sixth flipflop having a data input coupled to an output of the third logic gate, and a clock input coupled to an output of the second RS flipflop.

8. The serial peripheral interface of claim 7 further including:

a seventh flipflop having a data input coupled for receiving a logic signal, a reset input coupled to an output of the sixth flipflop, and a clock input coupled for receiving the clock signal;

a fourth logic gate having a first input coupled for receiving the clock signal, a second input coupled to an output of the seventh flipflop, and an output coupled to a clock input of the fourth flipflop; and a tri-state output device having an input coupled to the output of the fourth flipflop, a control input coupled to the output of the seventh flipflop, and an output coupled to the input of the second storage elements.

9. The serial peripheral interface of claim 1 further including a microcontroller having an output providing the data signal to the input of the one or more first storage elements.

10. A method of addressing cascaded serial peripheral interfaces (SPIs), comprising the steps of:

loading an address bit and one or more start bits via a data input into first storage elements of a first SPI, while inhibiting clocking of second storage elements of the first SPI;

determining whether the address bit and one or more start bits match an address for the first SPI;

shifting data bits via the same data input into the first storage elements of the first SPI if the address for the first SPI matched the address bit and one or more start bits;

shifting the address bit, the one or more start bits and the data bits along to second storage elements of the first SPI and further along to first storage elements of a second SPI if the address for the first SPI matched the address bit and one or more start bits; and receiving a first portion of an address of the second SPI hard-wired at an input of the first storage elements of the second SPI.

11. The method of claim 10 further including the step of providing a second portion of the address of the second SPI from the second storage elements of the first SPI to the second SPI via a data input terminal of the SPI.

12. The method of claim 11 further including the step of shifting the address bit, the one or more start bits and the data bits along to second storage elements of the second SPI upon matching the address of the second SPI.

13. The method of claim 12 wherein the step of providing a first portion of an address of the second SPI includes the step of establishing a logic level at the input of the first storage elements of the second SPI with a pull-up device or a pull-down device.

14. An integrated circuit for controlling a peripheral device with control data received by a serial peripheral interface comprising:
   a plurality of serially coupled storage elements addressed by receiving a first portion of an address hard-wired on an input of the storage elements and a second portion of the address in control data applied to the input of the storage elements, the storage elements comprising a plurality of series-connected flipflops, each having a data input, an output and a clock input for receiving a clock signal;
   a first logic gate having a first input coupled to the input of the storage elements;
   a first register having an output coupled to a second input of the first logic gate;
   a first RS flipflop having a reset input coupled for receiving a chip select signal, and a set input coupled for receiving the clock signal; and
   a fifth flipflop having a data input coupled to an output of the first logic gate, and a clock input coupled to an output of the first RS flipflop.

15. The integrated circuit of claim 14 further including a resistor coupled between the input of the storage elements and a first power supply conductor.

16. The integrated circuit of claim 14 further including:
   a second logic gate having a first input coupled to the output of the second flipflop;
   a second register having an output coupled to a second input of the second logic gate; and
   a second RS flipflop having a reset input coupled to an output of the fifth flipflop, and a set input coupled to an output of the second logic gate.

17. The integrated circuit of claim 16 further including:
   a third logic gate having a first input coupled to the output of the first flipflop;
   a third register having an output coupled to a second input of the third logic gate; and
   a sixth flipflop having a data input coupled to an output of the third logic gate, and a clock input coupled to an output of the second RS flipflop.

18. The integrated circuit of claim 17 further including:
   a seventh flipflop having a data input coupled for receiving a logic signal, a reset input coupled to an output of the sixth flipflop, and a clock input coupled for receiving the clock signal;
   a fourth logic gate having a first input coupled for receiving the clock signal, a second input coupled to an output of the seventh flipflop, and an output coupled to a clock input of the fourth flipflop; and
   a tri-state output device having an input coupled to the output of the fourth flipflop, a control input coupled to the output of the seventh flipflop, and an output coupled to the input of the second storage elements.

* * * * *